United States Patent [19]

Deschenes

[11] Patent Number: 5,631,631
[45] Date of Patent: May 20, 1997

[54] DEVICE FOR USE IN CONVEYING INFORMATION CONCERNING AN ARTICLE OF COMMERCE

[75] Inventor: Charles L. Deschenes, North Attleboro, Mass.

[73] Assignee: Avery Dennison Corporation, Pasadena, Calif.

[21] Appl. No.: 292,344

[22] Filed: Aug. 17, 1994

[51] Int. Cl.$^6$ .................................................. G08B 13/14
[52] U.S. Cl. ................................................ 340/572; 340/571
[58] Field of Search ...................................... 340/571, 572; 227/67, 120, 130; 24/704.1; 296/338

[56] References Cited

U.S. PATENT DOCUMENTS

| | | | |
|---|---|---|---|
| 2,774,060 | 12/1956 | Thompson | 340/572 |
| 3,713,133 | 1/1973 | Nathans | 340/572 |
| 3,720,940 | 3/1973 | Fox et al. | 340/572 |
| 3,911,534 | 10/1975 | Martens et al. | 340/572 |
| 4,000,488 | 12/1976 | Ephraim | 340/572 |
| 4,134,538 | 1/1979 | Lagarde et al. | 340/572 |
| 4,456,161 | 6/1984 | Russell | 227/67 |
| 4,626,311 | 12/1986 | Taylor | 340/572 |
| 4,783,646 | 11/1988 | Matsuzaki | 340/572 |
| 5,057,095 | 10/1991 | Fabian | 340/572 |
| 5,059,951 | 10/1991 | Kaltner | 340/572 |
| 5,079,541 | 1/1992 | Moody | 340/572 |
| 5,151,684 | 9/1992 | Johnsen | 340/572 |
| 5,523,747 | 6/1996 | Cole et al. | 340/825.54 |

*Primary Examiner*—Jeffery Hofsass
*Assistant Examiner*—Benjamin C. Lee
*Attorney, Agent, or Firm*—Kriegsman & Kriegsman

[57] ABSTRACT

A device for use in conveying information concerning an article of commerce. In one embodiment, the device comprises a fastener, the fastener comprising an elongated unitary plastic member having a first end, a second end, and a flexible filament. The flexible filament interconnects the first end and the second end. The first end is shaped to define a cross-bar insertable through an article of commerce using a tagger gun, the tagger gun having a hollow slotted needle. The second end is sized and shaped to define a paddle for preventing the flexible filament from being pulled completely through the article of commerce. The device also includes a transponder incorporated into the cross-bar portion of the fastener for transmitting, in response to an interrogation, a response signal communicating information concerning the article of commerce to which the fastener is attached. The transponder may include a programmable chip capable of encoding one or more static or varying pieces of information relating to the article of commerce. Examples of the types of information transmitted by the transponder include, but are not limited to, the price of the article, inventory information, and information as to whether the article has been duly purchased.

16 Claims, 1 Drawing Sheet

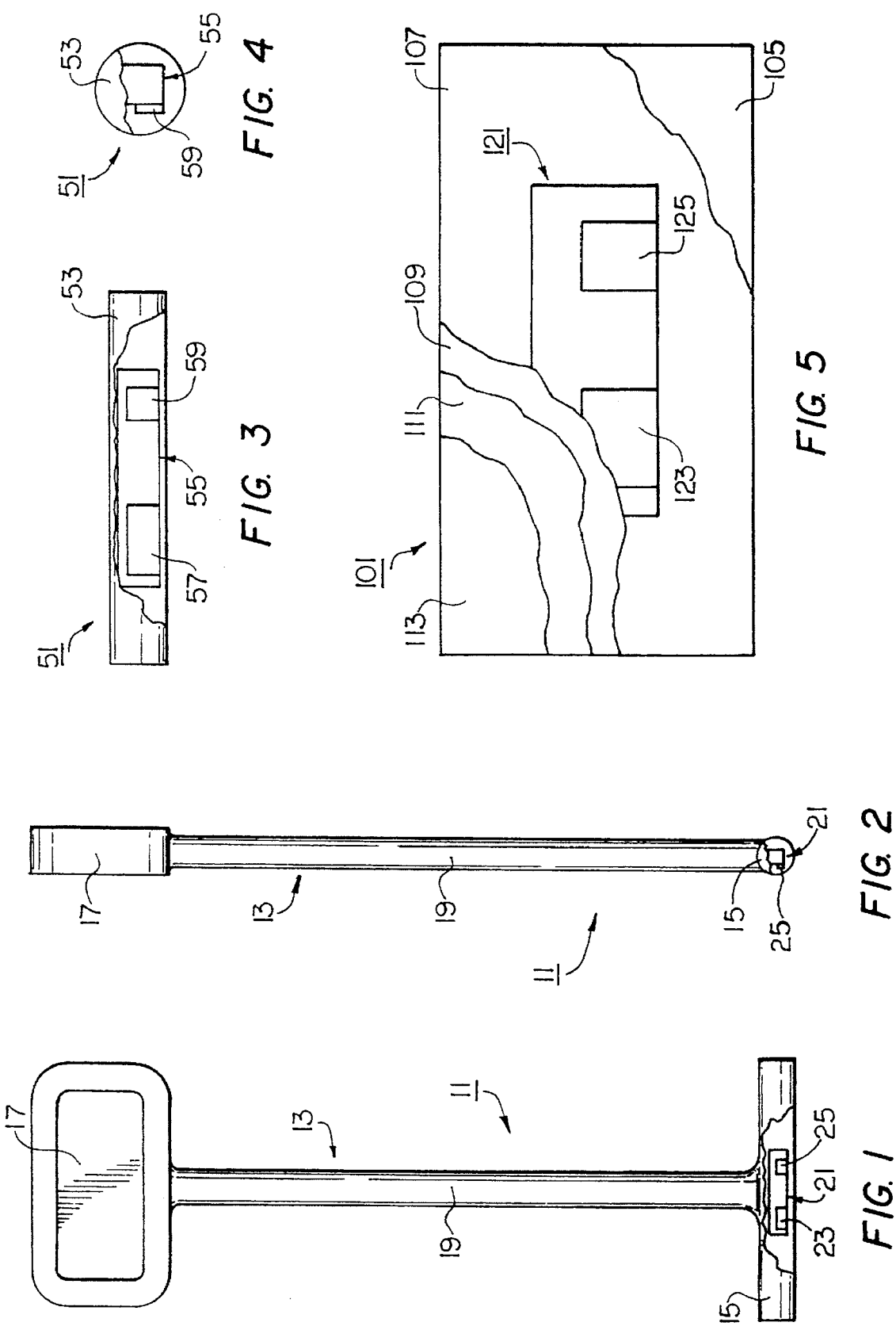

DEVICE FOR USE IN CONVEYING INFORMATION CONCERNING AN ARTICLE OF COMMERCE

BACKGROUND OF THE INVENTION

The present invention relates generally to plastic fasteners of the type commonly used, for example, to attach merchandise tags to articles of commerce.

Plastic fasteners of the type commonly used, for example, to attach merchandise tags to articles of commerce, such as articles of clothing, are well-known and are widely used in the retail industry. Typically, such fasteners comprise an elongated unitary plastic member having a first end shaped to define a cross-bar (also commonly referred to as a "T-bar"), a second end shaped to define a paddle (or a second cross-bar), and a thin flexible filament portion interconnecting the cross-bar and the paddle. The crossbar is appropriately sized and shaped to be inserted first through a merchandise tag and then through the article of commerce. The paddle is appropriately sized and shaped to prevent the tag from being pulled off the filament portion.

Typically, such fasteners are mass-produced by a molding process in either one of two different forms known as fastener stock. One type of fastener stock, which is disclosed in commonly-assigned U.S. Pat. No. 3,103,666 and which is incorporated herein by reference, comprises a plurality of fasteners joined together at their respective cross-bars by an orthogonally disposed runner bar. The other type of fastener stock, which is disclosed in commonly-assigned U.S. Pat. No. 4,955,475 and which is incorporated herein by reference, comprises a plurality of fasteners arranged in an end- to-end alignment, the heads and opposite ends of successive fasteners being joined together by severable connectors so as to form a continuously connected fastener stock.

The dispensing of individual fasteners from fastener stock into desired articles of commerce is typically accomplished using an apparatus commonly referred to as a "tagger gun." Examples of tagger guns are illustrated in commonly-assigned U.S. Pat. Nos. 5,320,269, 5,024,365, 4,121,487 and 4,456,161, all of which are incorporated herein by reference. Typically, a tagger gun includes (a) a hollow needle having a longitudinal slot extending across its length; (b) means for separating an individual crossbar from the remainder of the fastener stock; and (c) means for feeding the individual cross-bar through the hollow, slotted needle and the desired article of commerce. (Connections, if any, between the paddles of a pair of adjacent fasteners are severed by pulling the tagger gun away from the article of commerce after the cross-bar of one of the fasteners has been inserted thereinto.)

Although plastic fasteners of the type described above work well in the attachment of merchandise tags to article of commerce, it is nonetheless known that certain unscrupulous consumers, on occasion, engage in the practice of "ticket switching" wherein the price tag for a low-priced item is switched with the price tag for a desired high-priced item using the plastic fastener from either the low-priced or the high-priced item. Various approaches to this problem have been devised. See e.g., commonly-assigned U.S. Pat. No. 5,321,872, incorporated herein by reference, wherein a tamper-resistant plastic fastener is disclosed.

Although unrelated to the use of plastic fasteners, another common problem suffered by merchants is the theft of their merchandise. One approach that has been adopted by many merchants is the attachment of theft-detection devices to their articles of commerce. Such devices, which are typically quite large and conspicuous in appearance; are usually equipped with a magnetizable element which causes an audible signal or alarm to be emitted from a detector if the article is moved past the detector without previously demagnetizing the element. Typically, the sensor is located at the egress of the store so as to permit authorized personnel to demagnetize or remove the element following the purchase of the item.

Additional patents of interest include U.S. Pat. Nos. 5,151,684, 5,129,974, 4,966,857, 4,947,531,4,920,335, 4,822,990, 4,795,895, 4,299,040, 4,063,229, 4,000,488 and 3,825,801, all of which are incorporated herein by reference.

SUMMARY OF THE INVENTION

The present invention is directed to a novel device for use in conveying information concerning an article of commerce. In a first embodiment of the invention, the device comprises (a) a fastener, the fastener comprising an elongated unitary member having a first end, a second end, and a flexible filament, said flexible filament interconnecting said first end and said second end, said first end being shaped to define a cross-bar insertable through an article of commerce using a tagger gun, the tagger gun having a hollow slotted needle, said second end being sized and shaped to prevent said flexible filament from being pulled completely through the article of commerce; and (b) a transponder incorporated into said fastener for transmitting, in response to an interrogation, a response signal communicating information concerning the article of commerce to which the fastener is attached.

Preferably, the fastener is made of plastic, with the second end of the fastener being shaped to define a paddle and the transponder being embedded within the crossbar of the fastener. The transponder may include a programmable chip capable of storing one or more pieces of information relating to the article of commerce. Examples of the types of information transmitted by the transponder include, but are not limited to, the price of the article, inventory information, and information as to whether the article has been duly purchased.

As can readily be appreciated, the need for price tags and other types of merchandise tags can be drastically reduced by the use of the above-described device. In addition, by using the above-described device to convey price information, "ticket switching" can be made more difficult. Furthermore, by having the above-described device convey whether an article of commerce has been duly purchased and by strategically placing the device on the article of commerce, one can improve theft detection.

In a second embodiment, a device constructed according to the teachings of the present invention for use in conveying information concerning an article of commerce comprises (a) an elongated member insertable into an article of commerce using a tagger gun, the tagger gun having a hollow slotted needle; and (b) a transponder incorporated into said elongated member for transmitting, in response to an interrogation, a response signal communicating information relating to the article of commerce into which said elongated member is inserted.

Preferably, said elongated member is made of plastic. As described above in connection with the device of the first embodiment, the transponder may include a programmable chip capable of storing one or more pieces of information relating to the article of commerce. Examples of the types of information transmitted by the transponder include, but are not limited to, the price of the article, inventory information, and information as to whether the article has been duly purchased. Preferably, the device of the second embodiment is applied to a desired article of commerce by inserting the elongated member into a closed or partially-closed space (e.g., in a cuff, in a sealed pocket, etc.). As can readily be appreciated, because it can be introduced into hard-to-detect places of an article of commerce, the present device can be used covertly as a theft-detection device. In fact, where the transponder includes a programmable chip, the device can remain permanently within the article of commerce, being reprogrammed for inactivity at the time of purchase.

In a third embodiment, a device constructed according to the teachings of the present invention for use in conveying information concerning an article of commerce comprises (a) a label adapted to be affixed to an article of commerce, said label comprising two sheets of material arranged in a superimposed relationship; and (b) a transponder inserted between said two sheets of material for transmitting, in response to an interrogation, a response signal communicating information relating to the article of commerce to which said label is affixed.

It is to be understood that, instead of using a transponder in the device of the present invention, any suitable radio frequency resonance device or any other suitable electrically-, rf-, or magnetically-actuated passive or active device may be used.

Additional objects, features and advantages of the present invention will be set forth in part in the description which follows, and in part will be obvious from the description or may be learned by practice of the invention. These embodiments will be described in sufficient detail to enable those skilled in the art to practice the invention, and it is to be understood that other embodiments may be utilized and that changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention, In the drawings wherein like reference numerals represent like parts:

FIG. 1 is an enlarged front view, broken away in part, of a first embodiment of a device constructed according to the teachings of the present invention for use in conveying information concerning an article of commerce;

FIG. 2 is a right side view, broken away in part, of the device shown in FIG. 1;

FIG. 3 is an enlarged front view, broken away in part, of a second embodiment of a device constructed according to the teachings of the present invention for use in conveying information concerning an article of commerce;

FIG. 4 is a right side view, broken away in part, of the device shown in FIG. 3; and FIG. 5 is an enlarged plan view, broken away in part, of a third embodiment of a device constructed according to the teachings of present invention for use in conveying information concerning an article of commerce.

DETAILED DESCRIPTION OF PREFERRED EMBODIMENTS

Referring now to FIGS. 1 and 2, there are shown enlarged front and right side views, respectively, of a first embodiment of a device constructed according to the teachings of the present invention for use in conveying information concerning an article of commerce, the device being represented generally by reference numeral 11.

Device 11 includes a fastener 13. Fastener 13 is an elongated unitary plastic member having a first end which is shaped to define a cross-bar 15, a second end which is shaped to define a paddle 17, and a flexible filament 19 which interconnects cross-bar 15 and paddle 17. Cross-bar 15 is appropriately sized and shaped to be dispensed through an article of commerce using a tagger gun having a hollow slotted needle. Paddle 17 is appropriately sized and shaped to prevent flexible filament 19 from being pulled completely through an article of commerce through which cross-bar 15 has previously been inserted.

Device 11 also includes a transponder 21. Transponder 21, which in the present embodiment is completely embedded within cross-bar 15, includes a programmable chip 23 for storing desired information concerning the article of commerce to which fastener 13 is attached and an antenna 25 for transmitting, in response to receiving an interrogation from a suitable remote station, a response signal communicating the information stored on chip 23.

Device 11 may be made by molding fastener 13 around transponder 21. Mass-production of device 11 may be achieved by molding a number of fasteners 13 in either the form of continuously connected fastener stock or fastener stock of the type having an orthogonally disposed runner bar, each fastener 13 being molded around a corresponding transponder 21.

To use device 11, one stores desired information (e.g., the price of an article, inventory information, an indication as to whether an article has been duly purchased, etc.) on programmable chip 23, and then attaches fastener 13 to a desired article of commerce by inserting cross-bar 15 through the article. Preferably a tagger gun is used to insert cross-bar 15 through the article. When one wishes to ascertain the information stored on chip 23, an interrogation (i.e., command) signal is sent out in the direction of device 11. The interrogation signal elicits a response signal from device 11 which conveys the desired information.

It is to be understood that, although a programmable chip is used in the present embodiment to store the desired information, one could alternatively use a non-programmable (i.e., read-only) chip or means other than a chip for storing the desired information. One advantage to using a programmable chip, however, is that the information stored thereon can be changed, as desired. This may be advantageous, for example, in a situation where the chip is used to store price information and one wishes to discount the price of the article for a sale. This may also be advantageous, for example, in a situation where the chip is used to indicate that the article has not been duly purchased and one wishes to change that indication following purchase of the article. Alternatively, following the purchase of the article, device 11 may be removed from the purchased article in the same manner that conventional plastic fasteners are typically removed from articles to which they are attached.

Referring now to FIGS. 3 and 4, there are shown enlarged front and right side views, respectively, of a second embodiment of a device constructed according to the teachings of the present invention for use in conveying information concerning an article of commerce, the device being represented generally by reference numeral 51.

Device 51 comprises an elongated plastic member 53. Member 53, which may be identical in size, shape and composition to cross-bar 15 of device 11, is insertable into an article of commerce using a tagger gun having a hollow slotted needle.

Device 51 also comprises a transponder 55 embedded within member 53 for transmitting, in response to an interrogation, a response signal communicating information relating to the article of commerce into which member 53 is inserted. Transponder 55 may be identical to transponder 21 of device 11 and includes a programmable chip 57 and an antenna 59.

Device 51 may be made and used in a manner similar to that described above in connection with device 11. Because of its compact size and shape, device 51 is particularly well-suited to be inserted into the interior spaces of an article of commerce (e.g., inside a cuff, inside a pocket, between an inner piece and an outer piece of fabric which have been sewn together, etc.). In this manner, device 51 can be effectively concealed within an article of commerce. This may be highly advantageous, particularly where device 51 is to be used for theft-detection. Moreover, because of its small size, it may not be necessary for device 51, where concealed, to be removed from the article of commerce so long as it is reprogrammed, at the time of purchase, to indicate that the article has been duly purchased.

Referring now to FIG. 5, there is shown an enlarged plan view, broken away in part, of a third embodiment of a device constructed according to the teachings of the present invention for use in conveying information concerning an article of commerce, the device being represented generally by reference numeral 101.

Device 101 comprises a label 103 adapted to be affixed to an article of commerce. Label 103 comprises an adhesive layer 105, a first sheet of material 107 laminated over adhesive layer 105, a second sheet of material 109 laminated over sheet 107, inks 111 printed on sheet 109 and a protective layer 113 applied over inks 111.

Device 101 also includes a transponder 121 inserted between sheets 107 and 109 of label 103 for transmitting, in response to an interrogation, a response signal communicating information relating to the article of commerce to which said label is affixed. Transponder 121 may be identical to transponders 55 and 21 of devices 51 and 11, respectively and includes a programmable chip 123 and an antenna 125.

The embodiments of the present invention recited herein are intended to be merely exemplary and those skilled in the art will be able to make numerous variations and modifications to them without departing from the spirit of the present invention. All such variations and modifications are intended to be within the scope of the present invention as defined by the claims appended hereto.

What is claimed is:

1. A device for use in conveying information concerning an article of commerce, said device comprising:
   (a) a fastener, the fastener comprising an elongated unitary member having a first end, a second end, and a flexible filament, said flexible interconnecting said first end and said second end, said first end being shaped to define a cross-bar insertable through an article of commerce using a tagger gun, the tagger gun having a hollow slotted needle, for holding said first end of said fastener for the insertion of said first end through the article of commerce, said second end being sized and shaped to prevent said flexible filament from being pulled completely through the article of commerce; and
   (b) electronic means incorporated into said fastener for communicating information concerning the article of commerce to which the fastener is attached.

2. A device for use in conveying information concerning an article of commerce, said device comprising:
   (a) an elongated member insertable into an article of commerce using a tagger gun, the tagger gun having a hollow slotted needle for holding said elongated member during the insertion of said elongated member into said article of commerce; and
   (b) electronic means incorporated in said elongated member for communicating information relating to the article of commerce into which said elongated member is inserted.

3. A device for use in conveying information concerning an article of commerce, said device comprising:
   (a) a transponder for transmitting, in response to an innterrogation, a response signal communicating information relating to the article of commerce
   (b) an elongated plastic member is inserted into said article of commerce, said elongated plastic member being in the shape of a cross-bar and being part of a plastic fastener of the type comprising a flexible filament, a paddle at a first end of the flexible filament and a cross-bar at a second end of the flexible filament, said transponder being incorporated into said plastic member, wherein said elongated plastic member is inserted into said article of commerce using a tagger gun having a hollow slotted needle for holding the elongated member during insertion.

4. A device for use in conveying information concerning an article of commerce, said device comprising:
   (a) a fastener, the fastener comprising an elongated unitary member having a first end, a second end, and a flexible filament, said flexible filament interconnecting said first end and said second end, said first end being shaped to define a cross-bar insertable through an article of commerce using a tagger gun, the tagger gun having a hollow slotted needle for holding said first end of said fastener in the hollow slot for the insertion of said first end through the article Of commerce, said second end being sized and shaped to prevent said flexible filament from being pulled completely through the article of commerce; and (b) a transponder incorporated into said fastener for transmitting, in response to an interrogation, a response signal communicating information concerning the article of commerce to which the fastener is attached.

5. The device as claimed in claim 4 wherein said fastener is made of plastic.

6. The device as claimed in claim 4 wherein said transponder is embedded within said cross-bar.

7. The device as claimed in claim 4 wherein said second end is shaped to define a paddle.

8. The device as claimed in claim 4 wherein said transponder includes a data storage unit for storing said information and means for transmitting a signal conveying said information in response to receiving an interrogation.

9. The device as claimed in claim 4 wherein said transponder includes a memory chip for storing said information and an antenna for receiving said interrogation and for transmitting, in response thereto, a signal conveying said information.

10. The device as claimed in claim 5 wherein said chip is a programmable chip.

11. A device for use in conveying information concerning an article of commerce, said device comprising:
(a) an elongated member insertable into an article of commerce using a tagger gun, the tagger gun having a hollow slotted needle for holding said elongated member during the insertion of said elongated member into said article of commerce; and
(b) a transponder incorporated into said elongated member for transmitting, in response to an interrogation, a response signal communicating information relating to the article of commerce into which said elongated member is inserted.

12. The device as claimed in claim 11 wherein said elongated member is in the shape of a cross-bar.

13. The device as claimed in claim 11 wherein said elongated member is made of plastic.

14. The device as claimed in claim 11 wherein said transponder includes a data storage unit for storing said information and means for transmitting a signal conveying said information in response to receiving an interrogation.

15. The device as claimed in claim 11 wherein said transponder includes a memory chip for storing said information and an antenna for receiving said interrogation and for transmitting, in response thereto, a signal conveying said information.

16. The device as claimed in claim 15 wherein said chip is a programmable chip.

* * * * *